United States Patent
Yamamoto et al.

(10) Patent No.: US 10,241,369 B2
(45) Date of Patent: Mar. 26, 2019

(54) DISPLAY DEVICE

(71) Applicant: Sharp Kabushiki Kaisha, Sakai, Osaka (JP)

(72) Inventors: Etsuo Yamamoto, Sakai (JP); Hiroyuki Ohkawa, Sakai (JP); Shige Furuta, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 45 days.

(21) Appl. No.: 15/520,271

(22) PCT Filed: Nov. 13, 2015

(86) PCT No.: PCT/JP2015/081925
§ 371 (c)(1),
(2) Date: Apr. 19, 2017

(87) PCT Pub. No.: WO2016/080291
PCT Pub. Date: May 26, 2016

(65) Prior Publication Data
US 2017/0336667 A1    Nov. 23, 2017

(30) Foreign Application Priority Data

Nov. 21, 2014  (JP) .................................. 2014-236425

(51) Int. Cl.
*G02F 1/1345* (2006.01)
*G09G 3/36* (2006.01)
(Continued)

(52) U.S. Cl.
CPC ............ *G02F 1/13458* (2013.01); *G09F 9/00* (2013.01); *G09F 9/30* (2013.01); *G09G 3/006* (2013.01);
(Continued)

(58) Field of Classification Search
CPC combination set(s) only.
See application file for complete search history.

(56) References Cited

U.S. PATENT DOCUMENTS

2008/0001892 A1* 1/2008 Kim ...................... G02F 1/1345
345/97
2008/0179593 A1* 7/2008 Lim ........................ H01L 27/12
257/59

(Continued)

FOREIGN PATENT DOCUMENTS

JP          05-019282 A       1/1993

*Primary Examiner* — Patrick N Edouard
*Assistant Examiner* — Peijie Shen
(74) *Attorney, Agent, or Firm* — Keating & Bennett, LLP

(57) ABSTRACT

An object of the present invention is to realize a display device having a layered wiring structure, that is capable of detecting leakage without fail by using a simple testing circuit.

Source bus lines (SL) are wired such that, in the layered region, two source bus lines (SL) adjacent in a vertical direction are a combination of a source bus line (SL) of an odd-numbered column and a source bus line (SL) of an even-numbered column, and two source bus lines (SL) adjacent in a horizontal direction are a combination of a source bus line (SL) of an odd-numbered column and a source bus line (SL) of an even-numbered column. Potentials of different magnitudes are supplied respectively to source bus lines (SL) of odd-numbered columns and source bus lines (SL) of even-numbered columns via testing lines.

6 Claims, 22 Drawing Sheets

(51) Int. Cl.
*G09F 9/00* (2006.01)
*G09F 9/30* (2006.01)
*G09G 3/20* (2006.01)
*G09G 3/00* (2006.01)

(52) U.S. Cl.
CPC ............ *G09G 3/20* (2013.01); *G09G 3/3648* (2013.01); *G09G 3/3688* (2013.01); *G02F 1/1345* (2013.01); *G09G 2300/0426* (2013.01); *G09G 2320/0214* (2013.01); *G09G 2330/12* (2013.01)

(56) References Cited

U.S. PATENT DOCUMENTS

| | | | | |
|---|---|---|---|---|
| 2008/0203391 A1* | 8/2008 | Kim | ................ | G02F 1/1345 257/59 |
| 2008/0284697 A1* | 11/2008 | Nam | ................ | G02F 1/1345 345/87 |
| 2009/0096975 A1* | 4/2009 | Kwon | ............... | G02F 1/1345 349/139 |
| 2011/0063534 A1* | 3/2011 | Cho | ................ | G02F 1/1309 349/33 |
| 2014/0284574 A1* | 9/2014 | Hong | .............. | G02F 1/13452 257/40 |
| 2015/0325159 A1* | 11/2015 | Li | ................... | G02F 1/136286 702/117 |
| 2016/0026053 A1* | 1/2016 | Kawamura | .......... | G02F 1/1309 257/48 |
| 2017/0336688 A1* | 11/2017 | Yamamoto | ........... | G02F 1/1345 |

\* cited by examiner

Fig.8

| THIRD LAYER | SL3 | SL6 | SL9 | SL12 |
|---|---|---|---|---|
| SECOND LAYER | SL2 | SL5 | SL8 | SL11 |
| FIRST LAYER | SL1 | SL4 | SL7 | SL10 |

Fig.9

| THIRD LAYER | SL3 | SL4 | SL9 | SL10 |
|---|---|---|---|---|
| SECOND LAYER | SL2 | SL5 | SL8 | SL11 |
| FIRST LAYER | SL1 | SL6 | SL7 | SL12 |

Fig.10

| FOURTH LAYER | SL4 | SL5 | SL12 | SL13 |
| THIRD LAYER | SL3 | SL6 | SL11 | SL14 |
| SECOND LAYER | SL2 | SL7 | SL10 | SL15 |
| FIRST LAYER | SL1 | SL8 | SL9 | SL16 |

Fig.11

| FOURTH LAYER | SL2 | SL7 | SL10 | SL15 |
| THIRD LAYER | SL3 | SL6 | SL11 | SL14 |
| SECOND LAYER | SL4 | SL5 | SL12 | SL13 |
| FIRST LAYER | SL1 | SL8 | SL9 | SL16 |

Fig.12

| FOURTH LAYER | SL4 | SL5 | SL12 | SL13 |
| THIRD LAYER | SL1 | SL8 | SL9 | SL16 |
| SECOND LAYER | SL2 | SL7 | SL10 | SL15 |
| FIRST LAYER | SL3 | SL6 | SL11 | SL14 |

Fig.26 Prior Art

| SECOND LAYER | SL1 | SL3 | SL5 | SL7 | SL9 | SL11 |
| --- | --- | --- | --- | --- | --- | --- |
| FIRST LAYER | SL2 | SL4 | SL6 | SL8 | SL10 | SL12 |

DISPLAY DEVICE

TECHNICAL FIELD

The present invention relates to a display device, and more specifically to a display device having a layered wiring structure in a region between external connecting terminals on a panel substrate and an active area (display region).

BACKGROUND ART

A display device such as a liquid crystal display device, is provided with a large number of signal lines within a display region that is called as an active area. These signal lines are connected to external connecting terminals (terminals for receiving video signals output from a source driver IC mounted on the panel substrate, for example) disposed on a panel substrate. In the meantime, as to wiring between the active area and the external connecting terminals, as illustrated in FIG. 22, a wiring structure in a fan shape on a plane surface of the panel substrate is often employed.

In recent years, demands for downsizing of display devices have become increased. However, employment of a wiring structure as illustrated in FIG. 22 tends to increase a size of a picture-frame. In particular, when the number of signal lines provided within the active area increases due to increased resolution, a size of a picture-frame increases remarkably. An increase in the size of a picture-frame as described above makes downsizing of display devices difficult.

Thus, it is proposed to employ a layered structure having two or more layers for wiring between external connecting terminals and an active area. Here, the following description is given focusing on source bus lines (video signal lines) for transmitting video signals, among signal lines provided in the active area. FIG. 23 is a plan view illustrating one example of a conventional layered wiring structure. FIG. 24 is a diagram for detailed description of the wiring structure shown in FIG. 23. FIG. 23 shows source bus lines SL1 to SL12 of a first column to a twelfth column among a plurality of (e.g., 960) source bus lines disposed extending from external connecting terminals to the active area. It should be noted that, in the following description, the source bus lines are denoted by a reference character SL when the source bus lines do not need to be distinguished from each other.

The wiring structure illustrated in FIG. 23 and FIG. 24 is configured by wiring lines (first-layer wiring lines) K1 provided in a first layer (a lower layer in this case) and wiring lines (second-layer wiring lines) K2 provided in a second layer (an upper layer in this case). One (the source bus line SL2 in FIG. 24) of two adjacent source bus lines is configured only by a first-layer wiring line K1. The other (the source bus line SL1 in FIG. 24) of the two adjacent source bus lines is configured by the first-layer wiring line K1 and a second-layer wiring line K2. The first-layer wiring lines K1 and the second-layer wiring lines K2 are connected by contacts CT, respectively. Within a region denoted by a reference character 92 in FIG. 24, the first-layer wiring line K1 and the second-layer wiring line K2 are arranged so as to be overlapped with each other in a vertical direction (up-down direction). Here, an insulating layer (not shown) is disposed between the first-layer wiring line K1 and the second-layer wiring line K2.

By arranging the plurality of source bus lines SL so as to be overlapped with each other in the vertical direction as described above, it is possible to reduce the size of a picture-frame as compared to the case in which a wiring structure illustrated in FIG. 22 is employed. A display device having a layered wiring structure in this manner is disclosed, for example, in Japanese Laid-Open Patent Publication No. 05-19282.

PRIOR ART DOCUMENT

Patent Document

[Patent Document 1] Japanese Laid-Open Patent Publication No. 05-19282

SUMMARY OF THE INVENTION

Problems to be Solved by the Invention

However, in a case in which a wiring structure as illustrated in FIG. 23 is employed, when line leakage occurs due to a film residue, for example, it is often not possible to detect the leakage by a conventional simple testing circuit. This will be described in the following. It should be noted that, in the following description, a region having a layered wiring structure is referred to as a "layered region". Further, a region in which wiring is not layered (a region other than the layered region) is referred to as a "non-layered region". Regarding the display device having a layered wiring structure, there are the following three types of leakage (short circuit) between two source bus lines SL.

First type: leakage occurred between two adjacent source bus lines SL in a non-layered region.

Second type: leakage occurred between two adjacent source bus lines SL in the vertical direction in the layered region.

Third type: leakage occurred between two adjacent source bus lines SL in the horizontal direction in the layered region.

A portion indicated by a reference character 76 in FIG. 25 schematically shows leakage of the first type, a portion indicated by a reference character 77 in FIG. 25 schematically shows leakage of the second type, and a portion indicated by a reference character 78 in FIG. 25 schematically shows leakage of the third type.

Here, a consideration is given on provision of a conventional simple testing circuit having two testing lines for a display device having a conventional layered wiring structure illustrated in FIG. 23. Here, a cross-sectional view (schematic view) along line B-B in FIG. 23 is as shown in FIG. 26.

First, it is conceivable to employ a configuration as illustrated in FIG. 27 as a configuration of the testing circuit. The testing circuit includes two testing lines (a first testing line TL1 and a second testing line TL2), a single control line CL, and testing switches T_SW respectively provided for the source bus lines SL. To the first testing line TL1, a first potential TV1 is supplied. To the second testing line TL2, a second potential TV2 is supplied. Here, the magnitude of the first potential TV1 and the magnitude of the second potential TV2 are different. The testing switch T_SW is configured by a TFT. Regarding the testing switch T_SW, a gate electrode is connected to the control line CL, a drain electrode is connected to either of the first testing line TL1 and the second testing line TL2, and a source electrode is connected to the source bus line SL. The control line CL is supplied with a control signal for turning the testing switches T_SW on when an examination is carried out. In this configuration, the first potential TV1 is supplied as a testing potential to the source bus lines SL of the odd-numbered columns, and the second potential TV2 is supplied as a testing potential to the source bus lines SL of the even-numbered columns. According to this configuration, it is possible to detect leakage of the first type and leakage of the second type. However, it is not possible to detect leakage of the third type. For example, while the source bus line SL3 of the third column and the source bus line SL5 of the fifth column are adjacent in the second layer (see FIG. 26), testing potentials of the same magnitude are supplied to the source bus line SL3 of the third column and the source bus line SL5 of the fifth column as can be seen from FIG. 27. Therefore, it is not possible to detect leakage of the third type, such as leakage between the source bus line SL3 of the third column and the source bus line SL5 of the fifth column (see a heavy dashed line indicated by a reference character 96 in FIG. 27).

Further, it is conceivable to employ a configuration as illustrated in FIG. 28 as a configuration of the testing circuit. In this configuration, where n is an natural number, the first potential TV1 is supplied as a testing potential to the source bus lines SL of the (4n−3)th columns and the source bus lines SL of the (4n−2)th columns, and the second potential TV2 is supplied as a testing potential to the source bus lines SL of the (4n−1)th columns and the source bus lines SL of the 4n-th columns. According to this configuration, it is possible to detect leakage of the third type. However, it is not necessarily possible to detect leakage of the first type, and it is not possible to detect leakage of the second type. For example, while the source bus line SL5 of the fifth column and the source bus line SL6 of the sixth column are adjacent in the vertical direction in the layered region 50 (see FIG. 26), testing potentials of the same magnitude are supplied to the source bus line SL5 of the fifth column and the source bus line SL6 of the sixth column as can be seen from FIG. 28. Therefore, it is not possible to detect leakage of the second type, such as leakage between the source bus line SL5 of the fifth column and the source bus line SL6 of the sixth column (see a heavy dashed line indicated by a reference character 97 in FIG. 28)

Further, it is conceivable to employ a configuration as illustrated in FIG. 29 as a configuration of the testing circuit. In this configuration, where n is an natural number, the first potential TV1 is supplied as a testing potential to the source bus lines SL of the (4n−3)th columns and the source bus lines SL of the 4n-th columns, and the second potential TV2 is supplied as a testing potential to the source bus lines SL of the (4n−2)th columns and the source bus lines SL of the (4n−1)th columns. According to this configuration, it is possible to detect leakage of the second type and leakage of the third type. However, it is not necessarily possible to detect leakage of the first type. For example, while source bus line SL4 of the fourth column and the source bus line SL5 of the fifth column are adjacent in the non-layered region (see FIG. 23), testing potentials of the same magnitude are supplied to the source bus line SL4 of the fourth column and the source bus line SL5 of the fifth column as can be seen from FIG. 29. Therefore, it is not necessarily possible to detect leakage of the first type, such as leakage between the source bus line SL4 of the fourth column and the source bus line SL5 of the fifth column (see a heavy dashed line indicated by a reference character 98 in FIG. 29).

As described above, in the conventional display device having a layered wiring structure, it is not always possible to detect leakage of any of the patterns (the first to third patterns) described above by using a simple testing circuit having only two testing lines.

Thus, an object of the present invention is to realize a display device having a layered wiring structure, that is capable of detecting leakage without fail by using a simple testing circuit.

Means for Solving the Problems

A first aspect of the present invention is directed to a display device including:
a panel substrate including a layered region and a display region, the layered region having a layered wiring structure of a plurality of layers;
a plurality of video signal lines provided on the panel substrate;
a potential supply line configured to be able to supply a predetermined potential to each of the video signal lines; and
a plurality of external connecting terminals, provided on the panel substrate, for receiving supply of video signals to be applied to the plurality of video signal lines, wherein
the plurality of video signal lines are provided so as to extend from the plurality of external connecting terminals into the display region via the layered region, and
in the layered region, two video signal lines adjacent in a vertical direction are a combination of a video signal line of an odd-numbered column and a video signal line of an even-numbered column, and two video signal lines adjacent in a horizontal direction are a combination of a video signal line of an odd-numbered column and a video signal line of an even-numbered column.

According to a second aspect of the present invention, in the first aspect of the present invention,
the potential supply line includes a first-type potential supply line connected to the video signal line of the odd-numbered column and a second-type potential supply line connected to the video signal line of the even-numbered column.

According to a third aspect of the present invention, in the second aspect of the present invention,
the potential supply line includes a single first-type potential supply line and a single second-type potential supply line.

According to a fourth aspect of the present invention, in the second aspect of the present invention,
potentials of different values are respectively supplied to the first-type potential supply line and the second-type potential supply line.

According to a fifth aspect of the present invention, in the first aspect of the present invention,
a predetermined reference potential is supplied to the plurality of video signal lines via the potential supply line.

According to a sixth aspect of the present invention, in the first aspect of the present invention,
the panel substrate includes, as the layered region, a first layered region and a second layered region between the plurality of external connecting terminals and the display region, and
each of the plurality of video signal lines is wired in different layers in the first layered region and the second layered region.

Effects of the Invention

According to the first aspect of the present invention, in the display device having a layered wiring structure, for example, by supplying potentials different from each other respectively to two adjacent video signal lines using potential supply lines, it is possible to detect a leakage defect between the two video signal lines. Further, for example, by supplying a reference potential (ground potential) to all of the video signal lines using the potential supply lines when a device is turned off or terminated abnormally, it is possible to eliminate residual electric charges on the video signal lines.

According to the second aspect of the present invention, it is possible to easily supply potentials of different magnitudes to the video signal lines of the odd-numbered columns and the video signal lines of the even-numbered columns.

According to the third aspect of the present invention, since only two potential supply lines are provided, it is possible to reduce a picture-frame size. With this, it is possible to downsize the display device.

According to the fourth aspect of the present invention, by supplying potentials of different magnitudes to the video signal lines of the odd-numbered columns and the video signal lines of the even-numbered columns using the potential supply lines, the potentials of different magnitudes are supplied to any two adjacent video signal lines in the non-layered region, the potentials of different magnitudes are supplied to any two video signal lines adjacent in the vertical direction in the layered region, and the potentials of different magnitudes are supplied to any two video signal lines adjacent in the horizontal direction in the layered region. Here, in order to supply potentials of different magnitudes to the video signal lines of the odd-numbered columns and video signal lines of the even-numbered columns, two potential supply lines that serve as testing lines are sufficient. Thus, a display device having a layered wiring structure is realized, that is capable of detecting leakage without fail by using a simple circuit (testing circuit).

According to the fifth aspect of the present invention, since electric charges on the video signal lines can be eliminated when a device is turned off or terminated abnormally, for example, it is possible to suppress deterioration of display quality due to presence of a residual electric charge.

According to the sixth aspect of the present invention, in a display device having two layered regions, it is possible to achieve the same effect as that of the first aspect of the present invention.

BRIEF DESCRIPTION OF THE DRAWINGS

FIG. 8 is a schematic cross-sectional view illustrating one example of the wiring structure according to a first variant of the first embodiment.

FIG. 9 is a schematic cross-sectional view illustrating another example of the wiring structure according to the first variant of the first embodiment.

FIG. 10 is a schematic cross-sectional view illustrating one example of the wiring structure according to a second variant of the first embodiment.

FIG. 11 is a schematic cross-sectional view illustrating another example of the wiring structure according to the second variant of the first embodiment.

FIG. 12 is a schematic cross-sectional view illustrating still another example of the wiring structure according to the second variant of the first embodiment.

FIG. 26 is a cross-sectional view (schematic view) taken along line B-B in FIG. 23.

MODES FOR CARRYING OUT THE INVENTION

Hereinafter, embodiments according to the present invention will be described with reference to the accompanying drawings.

<1. First Embodiment>
<1.1. Entire Configuration and Schematic Operation>

Figure 2:
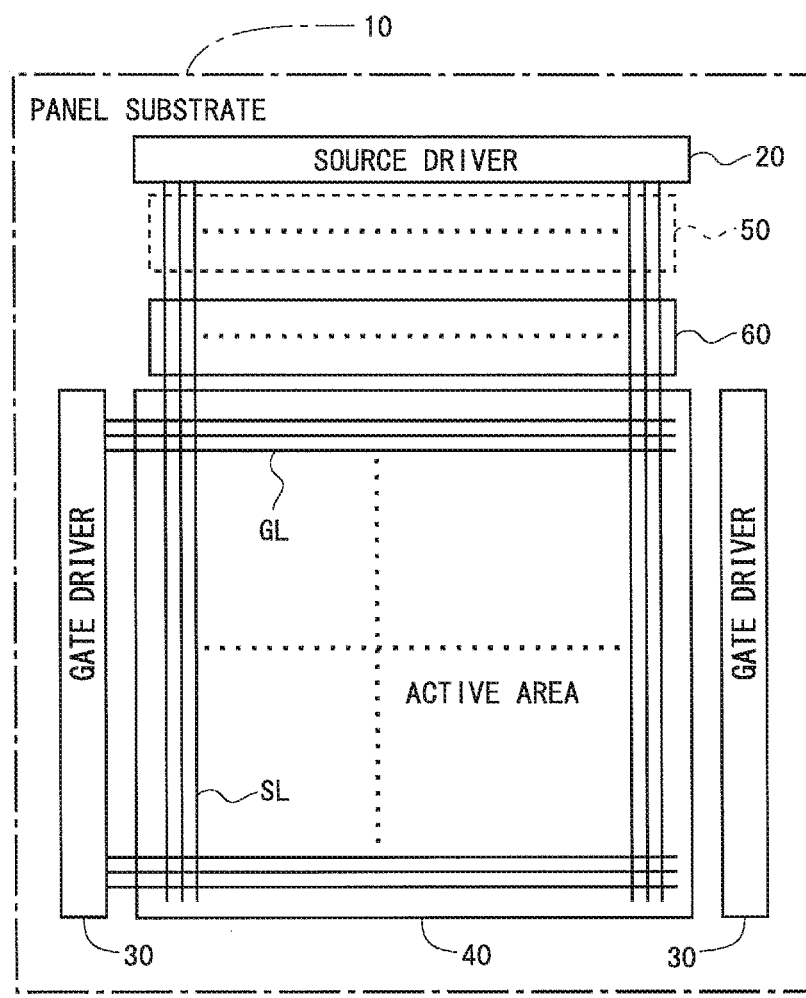
FIG. 2 is a block diagram illustrating an entire configuration of the liquid crystal display device according to the first embodiment.
Figure 3:
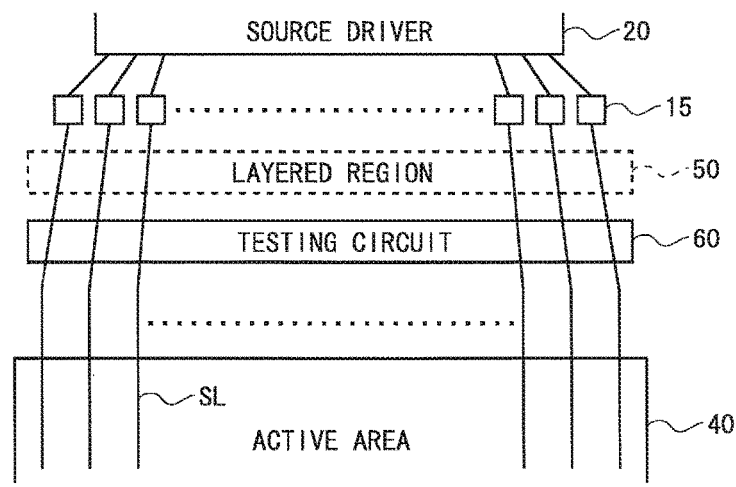
FIG. 3 is a diagram for illustration of a position where the layered region is provided according to the first embodiment.

FIG. 2 is a block diagram illustrating an entire configuration of an active matrix-type liquid crystal display device according to a first embodiment of the present invention. As illustrated in FIG. 2, this liquid crystal display device is provided with a source driver 20, a gate driver 30, a testing circuit 60, and an active area (display region) 40. The active area 40, the gate driver 30, and the testing circuit 60 are provided on a panel substrate 10. Here, the panel substrate 10 in this embodiment is a glass substrate. The source driver 20 is mounted on the panel substrate 10 in a COG (Chip On Glass) manner, for example. Specifically, the source driver 20 in this embodiment is an IC chip. On the panel substrate 10, external connecting terminals for receiving video signals output from the source driver 20 which is an IC chip are provided. Here, a region indicated by a reference character 50 in FIG. 2 is a layered region (a region having a layered wiring structure). As illustrated in FIG. 3, the layered region 50 is provided between external connecting terminals 15 and the testing circuit 60. The wiring structure of the layered region 50 will be described in detail later. The testing circuit 60 examines whether or not there is leakage between adjacent source bus lines SL. A detailed description of the testing circuit 60 will be given later.

In the active area 40, a plurality of source bus lines SL and a plurality of gate bus lines GL are provided. A pixel formation portion constituting a pixel (not shown in FIG. 2) is provided correspondingly at each of intersections between the plurality of source bus lines SL and the plurality of gate bus lines GL. Specifically, the active area 40 is provided with a plurality of pixel formation portions.

Figure 4:
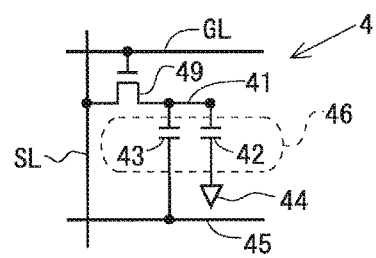
FIG. 4 is a diagram illustrating a configuration of a pixel formation portion according to the first embodiment.

FIG. 4 is a diagram illustrating a configuration of a pixel formation portion 4. As illustrated in FIG. 4, the pixel formation portion 4 includes a TFT (Thin-Film Transistor) 49 as a switching element in which a gate bus line GL passing a corresponding intersection is connected to a gate terminal and a source bus line SL passing the same intersection is connected to a source terminal, a pixel electrode 41 connected to a drain terminal of the TFT 49, a common electrode 44 and an auxiliary capacitance electrode 45 commonly provided for the plurality of pixel formation portions 4, a liquid crystal capacitance 42 constituted by the pixel electrode 41 and the common electrode 44, and an auxiliary capacitance 43 constituted by the pixel electrode 41 and the auxiliary capacitance electrode 45. The liquid crystal capacitance 42 and the auxiliary capacitance 43 constitute a pixel capacitance 46.

In the meantime, as the TFT 49 in the pixel formation portion 4, an oxide TFT (a thin-film transistor in which an oxide semiconductor is used for a channel layer) may be employed, for example. Examples of the oxide TFT include TFTs containing InGaZnO (Indium Gallium Zinc Oxide). The oxide TFT is characterized by high mobility and low leakage current. Therefore, employing an oxide TFT provides effects of downsizing and reduced power consumption. However, the present invention is not limited to such an example. For example, it is possible to employ a TFT in which amorphous silicon is used for a channel layer.

It should be noted that it is herein assumed that a display controller for controlling an operation of the source driver 20 and the gate driver 30 is provided outside the panel substrate (e.g., on a flexible substrate connected to the panel substrate 10). A digital video signal and a source control signal are transmitted to the source driver 20 from the display controller, and a gate control signal is transmitted to the gate driver 30 from the display controller. The source control signal includes, for example, a source start pulse signal, a source clock signal, and a latch strobe signal. The gate control signal includes, for example, a gate start pulse signal and a gate clock signal.

The source driver 20 receives the digital video signal and the source control signal transmitted from the display controller, and applies a video signal for driving to each of the source bus lines SL. At this time, the source driver 20 sequentially holds digital video signals indicating voltages to be applied to the respective source bus lines SL at timing at which a pulse of the source clock signal is generated. Then, at timing at which a pulse of the latch strobe signal is generated, the held digital video signals are converted into analog voltages. The converted analog voltages are applied as the video signals for driving to all the source bus lines SL at once. The gate driver 30 repeats application of an active scanning signal to each of the gate bus lines GL with one vertical scanning period taken as a cycle, based on the gate control signal transmitted from the display controller.

As described above, by applying a video signal for driving to each of the source bus lines SL and applying a scanning signal to each of the gate bus lines GL, a desired image is displayed on the active area 40 serving as a display region.

<1.2 Wiring Structure Between External Connecting Terminal and Active Area>

Figure 1:
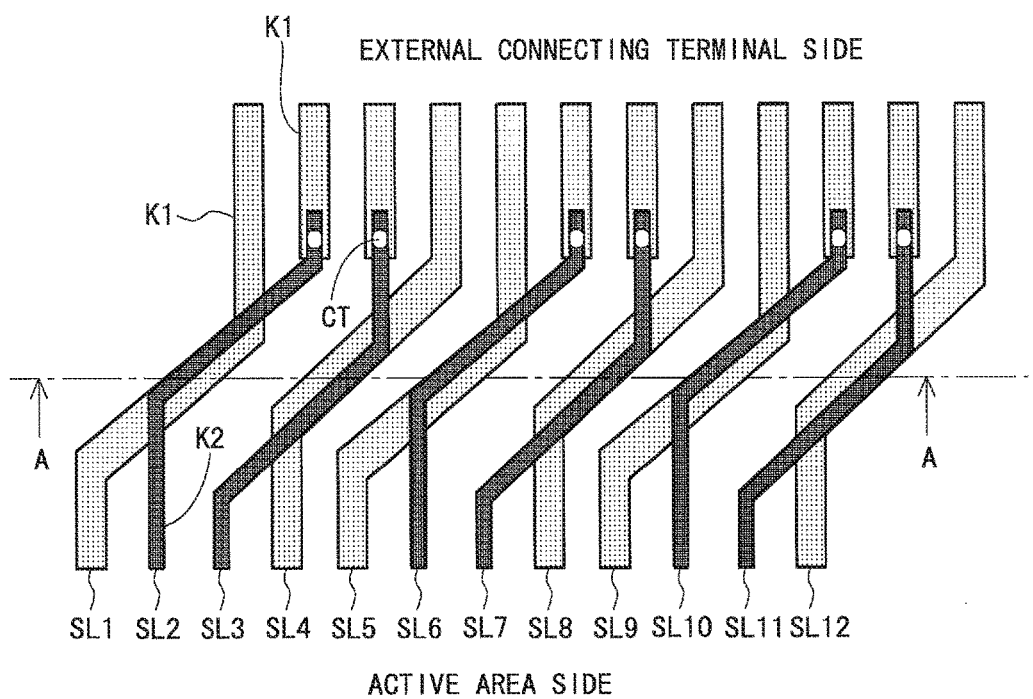
FIG. 1 is a plan view illustrating a wiring structure of a layered region in a liquid crystal display device according to a first embodiment of the present invention.

Referring to FIG. 1, a description will be given of a wiring structure between the external connecting terminals (terminals for receiving video signals output from the source driver 20 which is an IC chip) 15 provided on the panel substrate 10 and the active area 40 (here, the testing circuit 60 is omitted). FIG. 1 is a plan view illustrating the wiring structure of the layered region 50 according to this embodiment. The wiring structure is configured by first-layer wiring lines K1 provided in a first layer (a lower layer in this case) and second-layer wiring lines K2 provided in a second layer (an upper layer in this case). The first-layer wiring lines K1 and the second-layer wiring lines K2 are connected by contacts CT, respectively.

Here, the source bus lines SL1 to SL4 of the first column to the fourth column are focused on in FIG. 1. The source bus line SL1 of the first column and the source bus line SL4 of the fourth column are configured only by the first-layer wiring lines K1, the source bus line SL2 of the second column and the source bus line SL3 of the third column are configured by the first-layer wiring lines K1 and the second-layer wiring lines K2. For the source bus lines SL of the fifth column and after, this configuration is repeatedly provided every four columns. Specifically, where n is a natural number, each of source bus lines SL of (4n−3)th columns and source bus lines SL of 4n-th columns is configured only by the first-layer wiring line K1, and each of source bus lines SL of (4n−2)th columns and source bus lines SL of (4n−1)th columns is configured by the first-layer wiring line K1 and the second-layer wiring line K2.

Figure 5:
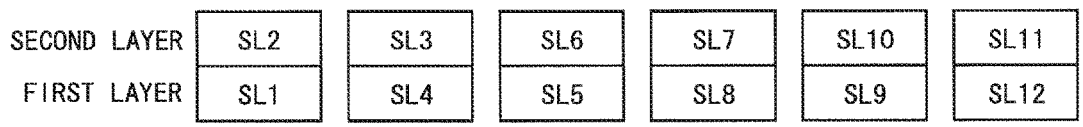
FIG. 5 is a cross-sectional view (schematic view) taken along line A-A in FIG. 1.

FIG. 5 is a cross-sectional view (schematic view) taken along line A-A in FIG. 1. As can be seen from FIG. 5, on the line A-A in FIG. 1, the source bus lines SL of the (4n−3)th columns and the source bus lines SL of the 4n-th columns are provided in the first layer, and the source bus lines SL of the (4n−2)th columns and the source bus lines SL of the (4n−1)th columns are provided in the second layer.

<1.3 Configuration of Testing Circuit>

Figure 6:
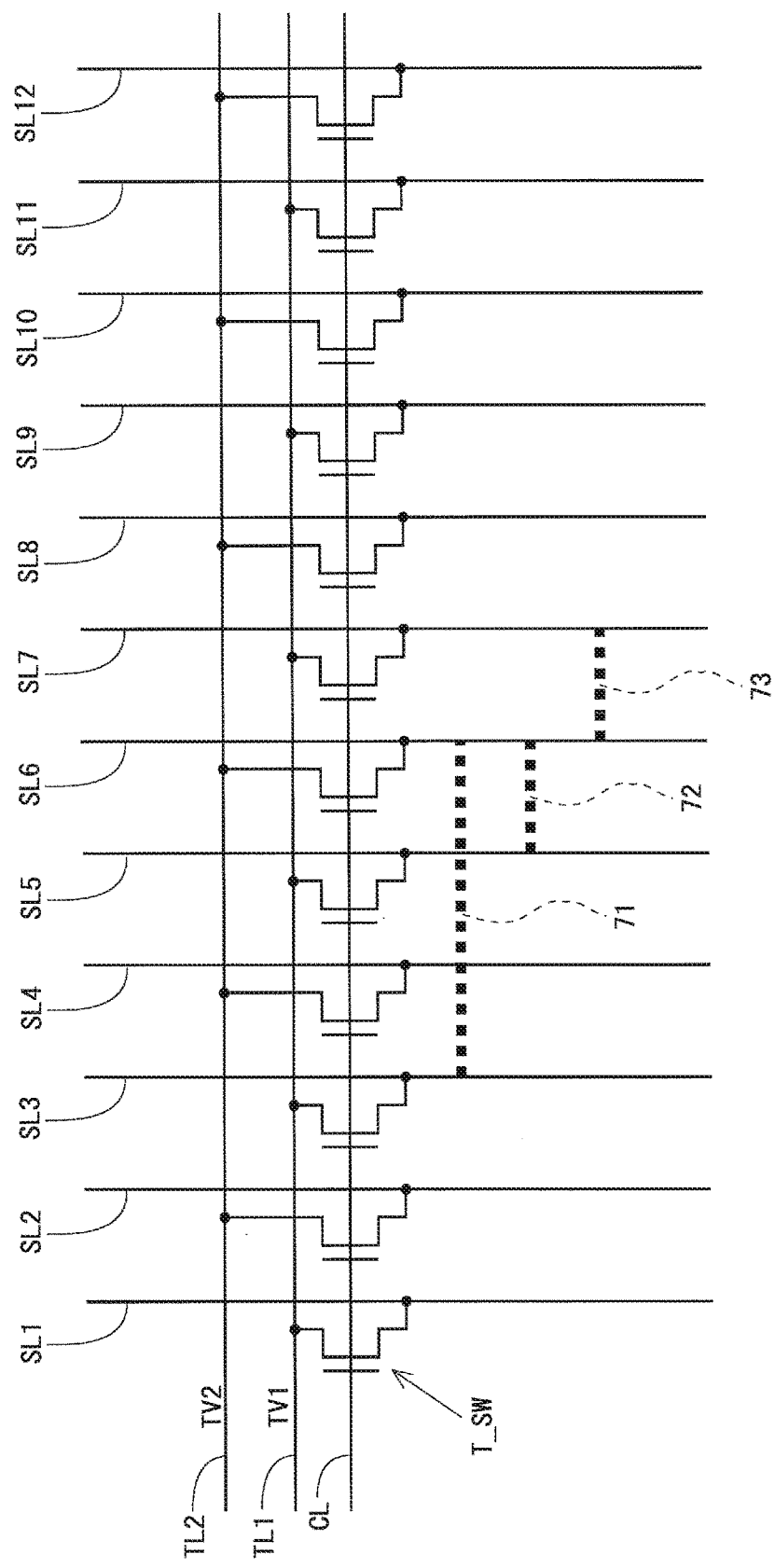
FIG. 6 is a circuit diagram illustrating a detailed configuration of a testing circuit according to the first embodiment.

FIG. 6 is a circuit diagram illustrating a detailed configuration of the testing circuit 60 according to this embodiment. The testing circuit 60 includes two testing lines (a first testing line TL1 and a second testing line TL2), a single control line CL, and testing switches T_SW respectively provided for the source bus lines SL. To the first testing line TL1, a first potential TV1 is supplied. To the second testing line TL2, a second potential TV2 is supplied. Here, the magnitude of the first potential TV1 and the magnitude of the second potential TV2 are different. Each of the testing switches T_SW is configured by a TFT. Regarding the testing switch T_SW, a gate electrode is connected to the control line CL, a drain electrode is connected to either of the first testing line TL1 and the second testing line TL2, and a source electrode is connected to the source bus line SL. The control line CL is supplied with a control signal for turning the testing switches T_SW on when an examination is carried out. Here, in this embodiment, a first-type potential supply line is implemented by the first testing line TL1, and a second-type potential supply line is implemented by the second testing line TL2.

As illustrated in FIG. 6, in this embodiment, the drain electrodes of the testing switches T_SW provided respectively for the source bus lines SL of the odd-numbered columns are all connected to the first testing line TL1. Further, the drain electrodes of the testing switches T_SW provided respectively for the source bus lines SL of the even-numbered columns are all connected to the second testing line TL2.

<1.4 Examination Using Testing Circuit>

As described above, regarding the liquid crystal display device having a layered wiring structure, there are the following three types of leakage (short circuit) between two source bus lines SL.

First type: leakage occurred between two adjacent source bus lines SL in a non-layered region.

Second type: leakage occurred between two adjacent source bus lines SL in the vertical direction in the layered region 50.

Third type: leakage occurred between two adjacent source bus lines SL in the horizontal direction in the layered region 50.

Figure 7:
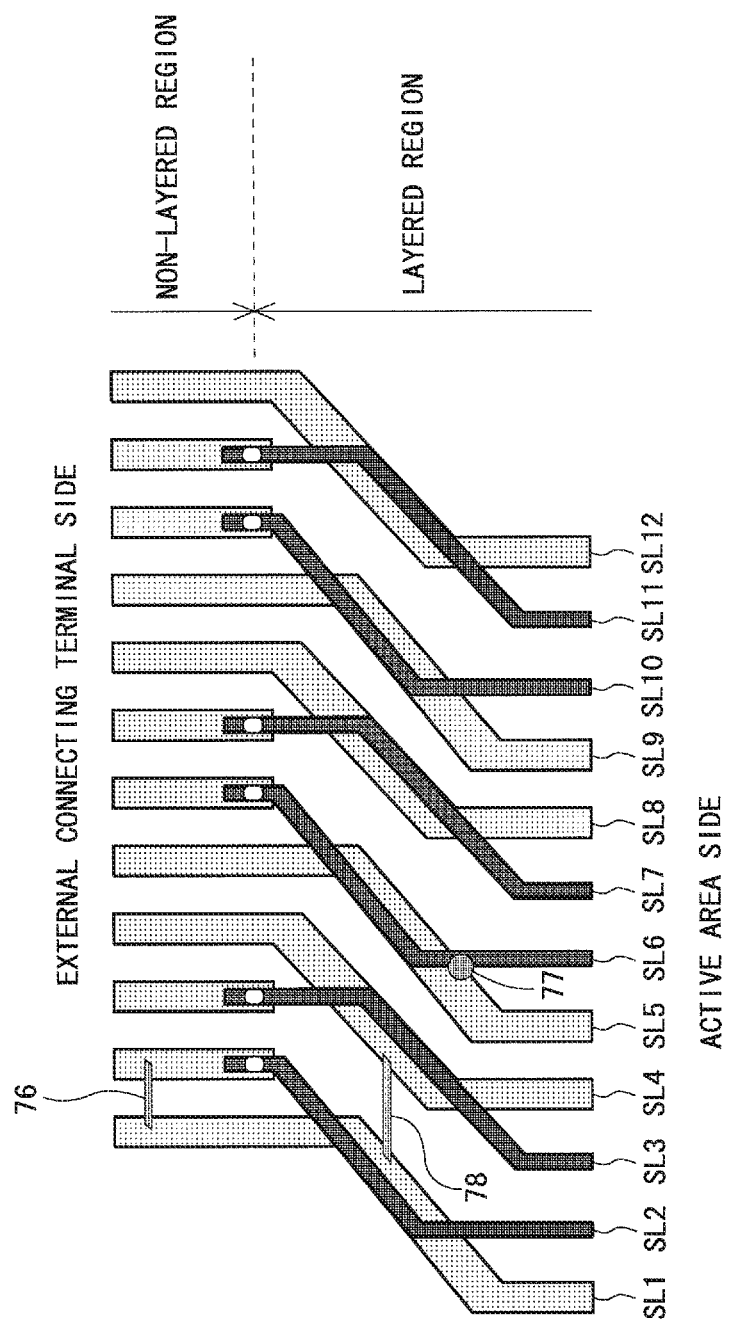
FIG. 7 is a diagram for description of leakage of a first type to a third type according to the first embodiment.

A portion indicated by a reference character 76 in FIG. 7 schematically shows leakage of the first type, a portion indicated by a reference character 77 in FIG. 7 schematically shows leakage of the second type, and a portion indicated by a reference character 78 in FIG. 7 schematically shows leakage of the third type.

Here, the source bus line SL6 of the sixth column is focused on. Examples of leakage occurred between the source bus line SL6 of the sixth column and another source bus lines SL (leakage of the first type to the third type) include the following.

First type: leakage between the source bus line SL6 of the sixth column and the source bus line SL5 of the fifth column, and leakage between the source bus line SL6 of the sixth column and the source bus line SL7 of the seventh column (see FIG. 1).

Second type: leakage between the source bus line SL6 of the sixth column and the source bus line SL5 of the fifth column (see FIG. 5).

Third type: leakage between the source bus line SL6 of the sixth column and the source bus line SL3 of the third column, and leakage between the source bus line SL6 of the sixth column and the source bus line SL7 of the seventh column (see FIG. 5).

In the meantime, in order to examine whether or not there is leakage between two source bus lines SL, it is necessary to supply testing potentials of different magnitudes respectively to the two source bus lines SL. In the examples above, it is necessary to supply the source bus line SL6 of the sixth column with a testing potential whose magnitude is different from that of testing potentials supplied to the source bus lines SL3, SL5, and SL7 of the third column, the fifth column, and the seventh column. In this regard, as can be seen from FIG. 6, the second potential TV2 is supplied as a testing potential to the source bus line SL6 of the sixth column, and the first potential TV1 is supplied as a testing potential to the source bus lines SL3, SL5, and SL7 of the third column, the fifth column, and the seventh column. Therefore, it is possible to detect leakage between the source bus line SL6 of the sixth column and the source bus line SL3 of the third column (see a heavy dashed line indicated by a reference character 71 in FIG. 6), leakage between the source bus line SL6 of the sixth column and the source bus line SL5 of the fifth column (see a heavy dashed line indicated by a reference character 72 in FIG. 6), and leakage between the source bus line SL6 of the sixth column and the source bus line SL7 of the seventh column (see a heavy dashed line indicated by a reference character 73 in FIG. 6). Specifically, leakage of any of the first type, the second type, and the third type can be detected.

<1.5 Effects>

According to this embodiment, as can be seen from FIG. 5, two source bus lines SL adjacent in the vertical direction in the layered region 50 are a combination of a source bus line SL of an odd-numbered column and a source bus line SL of an even-numbered column, and two source bus lines SL adjacent in the horizontal direction in the layered region 50 are a combination of a source bus line SL of an odd-numbered column and a source bus line SL of an even-numbered column. Because such a wiring structure is employed, by supplying testing potentials of different magnitudes to the source bus lines SL of the odd-numbered columns and the source bus lines SL of the even-numbered columns using the two testing lines as illustrated in FIG. 6, the testing potentials of different magnitudes are supplied to any two adjacent source bus lines SL in the non-layered region, the testing potentials of different magnitudes are supplied to any two source bus lines SL adjacent in the vertical direction in the layered region 50, and the testing potentials of different magnitudes are supplied to any two source bus lines SL adjacent in the horizontal direction in the layered region 50. As described above, it is possible to detect leakage of any of patterns (the first to third patterns) described above without fail by using the testing circuit 60 having only two testing lines. In this manner, according to this embodiment, a display device having a layered wiring structure is realized, that is capable of detecting leakage without fail by using a simple testing circuit.

Further, according to this embodiment, providing only two testing lines is sufficient, a picture-frame size can be reduced. With this, it is possible to downsize the display device.

<1.6 Variants>

Hereinafter, different variants according to the first embodiment will be described.

<1.6.1 Layers of Wiring>

Although the number of the layers of wiring is two in the first embodiment, the present invention is not limited to such an example. The present invention may also be applied to a case in which the number of the layers of wiring is three or more. Therefore, in the following, an example in which the number of the layers of wiring is three will be described as a first variant, and an example in which the number of the layers of wiring is four will be described as a second variant.

<1.6.1 First Variant>

FIG. 8 is a schematic cross-sectional view illustrating one example of the wiring structure according to this variant. As can be seen from FIG. 8, in the layered region, two source bus lines SL adjacent in the vertical direction are a combination of a source bus line SL of an odd-numbered column and a source bus line SL of an even-numbered column, and two source bus lines SL adjacent in the horizontal direction are a combination of a source bus line SL of an odd-numbered column and a source bus line SL of an even-numbered column. Here, a consideration is given on provision of the testing circuit 60 having a configuration illustrated in FIG. 6 for a liquid crystal display device having a wiring structure as illustrated in FIG. 8.

According to the testing circuit 60 having the configuration illustrated in FIG. 6, testing potentials of different magnitudes are supplied respectively to the source bus lines SL of the odd-numbered columns and the source bus lines SL of the even-numbered columns. Then, as can be seen from FIG. 8, testing potentials of different magnitudes are supplied respectively to any two source bus lines SL adjacent in the vertical direction in the layered region 50, and testing potentials of different magnitudes are also supplied respectively to any two source bus lines SL adjacent in the horizontal direction in the layered region 50. Further, testing potentials of different magnitudes are supplied respectively to any two adjacent source bus lines SL in the non-layered region.

Thus, even when the number of layers of wiring is three, it is possible to detect leakage of any of patterns (the first to third patterns) described above without fail by using the testing circuit 60 having only two testing lines. Specifically, also in this variant, similarly to the first embodiment, a display device having a layered wiring structure is realized, that is capable of detecting leakage without fail by using a simple testing circuit.

FIG. 9 is a schematic cross-sectional view illustrating another example of the wiring structure according to this variant. Similarly to the example illustrated in FIG. 8, in the layered region, two source bus lines SL adjacent in the vertical direction are a combination of a source bus line SL of an odd-numbered column and a source bus line SL of an even-numbered column, and two source bus lines SL adjacent in the horizontal direction are a combination of a source bus line SL of an odd-numbered column and a source bus line SL of an even-numbered column. Accordingly, testing potentials of different magnitudes are supplied respectively to any two source bus lines SL adjacent in the vertical direction in the layered region 50, and testing potentials of different magnitudes are also supplied respectively to any two source bus lines SL adjacent in the horizontal direction in the layered region 50. Further, testing potentials of different magnitudes are also supplied respectively to any two adjacent source bus lines SL in the non-layered region. Therefore, also in this variant, it is possible to detect leakage of any of patterns described above without fail by using the testing circuit 60 having only two testing lines. Specifically, also in this variant, a display device having a layered wiring structure is realized, that is capable of detecting leakage without fail by using a simple testing circuit.

<1.6.2 Second Variant>

FIG. 10 is a schematic cross-sectional view illustrating one example of the wiring structure according to this variant. FIG. 11 is a schematic cross-sectional view illustrating another example of the wiring structure according to this variant. FIG. 12 is a schematic cross-sectional view illustrating still another example of the wiring structure according to this variant. In any of the configurations illustrated in FIG. 10 to FIG. 12, in the layered region, two source bus lines SL adjacent in the vertical direction are a combination of a source bus line SL of an odd-numbered column and a source bus line SL of an even-numbered column, and two source bus lines SL adjacent in the horizontal direction are a combination of a source bus line SL of an odd-numbered column and a source bus line SL of an even-numbered column. Accordingly, similarly to the first variant, also in this variant, a display device having a layered wiring structure is realized, that is capable of detecting leakage without fail by using a simple testing circuit.

<1.6.3 Third Variant>

Although the panel substrate 10 is provided with only one layered region 50 in the first embodiment, the present invention is not limited to such an example. Then, in the following, an example in which the panel substrate 10 is provided with two layered regions 50 will be described as a third variant.

Figure 13:
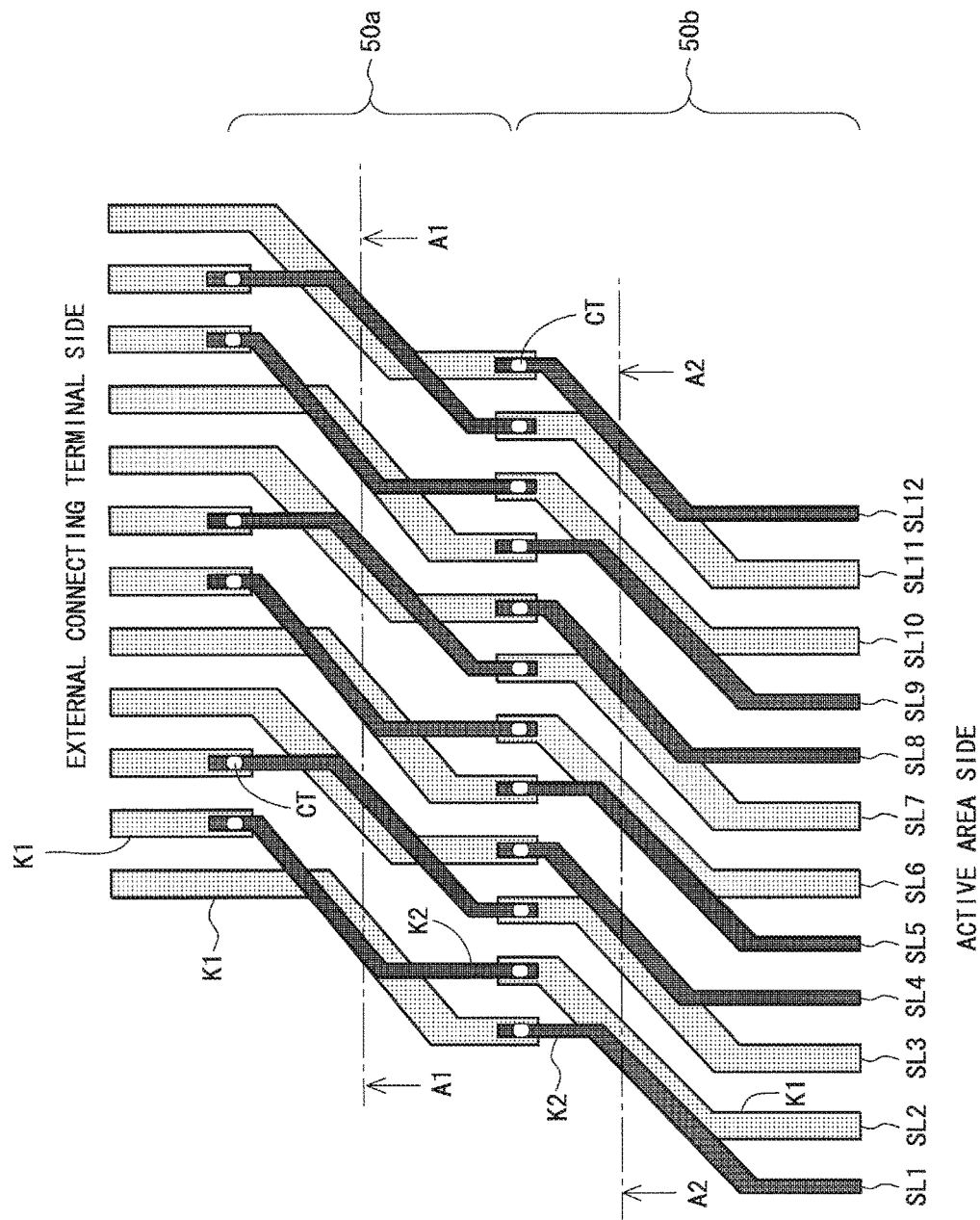
FIG. 13 is a plan view illustrating the wiring structure of a layered region in a third variant of the first embodiment.
Figure 14:
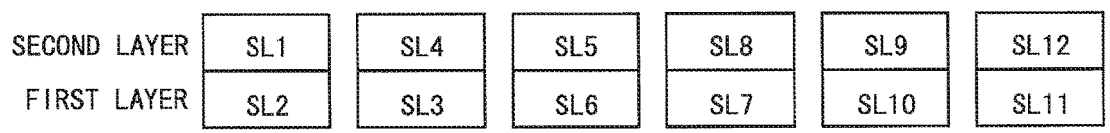
FIG. 14 is a cross-sectional view taken along line A2-A2 in FIG. 13.

FIG. 13 is a plan view illustrating a wiring structure (a wiring structure between the external connecting terminals 15 and the active area 40) of the layered region 50 according to this variant. As illustrated in FIG. 13, the liquid crystal display device according to this variant is provided with two layered regions (a first layered region 50*a* and a second layered region 50*b*). A cross-sectional view of the first layered region 50*a* (a cross-sectional view taken along line A1-A1 in FIG. 13) is as shown in FIG. 5. A cross-sectional view of the second layered region 50*b* (a cross-sectional view taken along line A2-A2 in FIG. 13) is as shown in FIG. 14. As can be seen from FIG. 13, FIG. 5, and FIG. 14, the source bus lines SL provided in the first layer in the first layered region 50*a* are provided in the second layer in the second layered region 50*b*, and the source bus lines SL provided in the second layer in the first layered region 50*a* are provided in the first layer in the second layered region 50*b*.

In the first embodiment, the source bus lines SL of a half of an entire lines are configured only by the first-layer wiring lines K1, and the remaining half of the source bus lines SL are configured by the first-layer wiring lines K1 and the second-layer wiring lines K2. By contrast, in this variant, all of the source bus lines SL are configured by the first-layer wiring lines K1 and the second-layer wiring lines K2. It should be noted that, regarding all of the source bus lines SL, the first-layer wiring lines K1 and the second-layer wiring lines K2 are respectively connected by the contacts CT at a boundary portion between the first layered region 50*a* and the second layered region 50*b*.

As can be seen from FIG. 5 and FIG. 14, both in the first layered region 50*a* and in the second layered region 50*b*, two source bus lines SL adjacent in the vertical direction are a combination of a source bus line SL of an odd-numbered column and a source bus line SL of an even-numbered column, and two source bus lines SL adjacent in the horizontal direction are a combination of a source bus line SL of an odd-numbered column and a source bus line SL of an even-numbered column. Therefore, also in the case in which the two layered regions 50 are disposed on the panel substrate 10, it is possible to detect leakage without fail by using a simple testing circuit.

<1.6.4 Fourth Variant>

Although the testing circuit 60 includes only two testing lines in the first embodiment, the present invention is not limited to such an example. The testing circuit 60 may include three or more testing lines. Then, in the following, an example in which the testing circuit 60 includes four testing lines will be described as a fourth variant.

Figure 15:
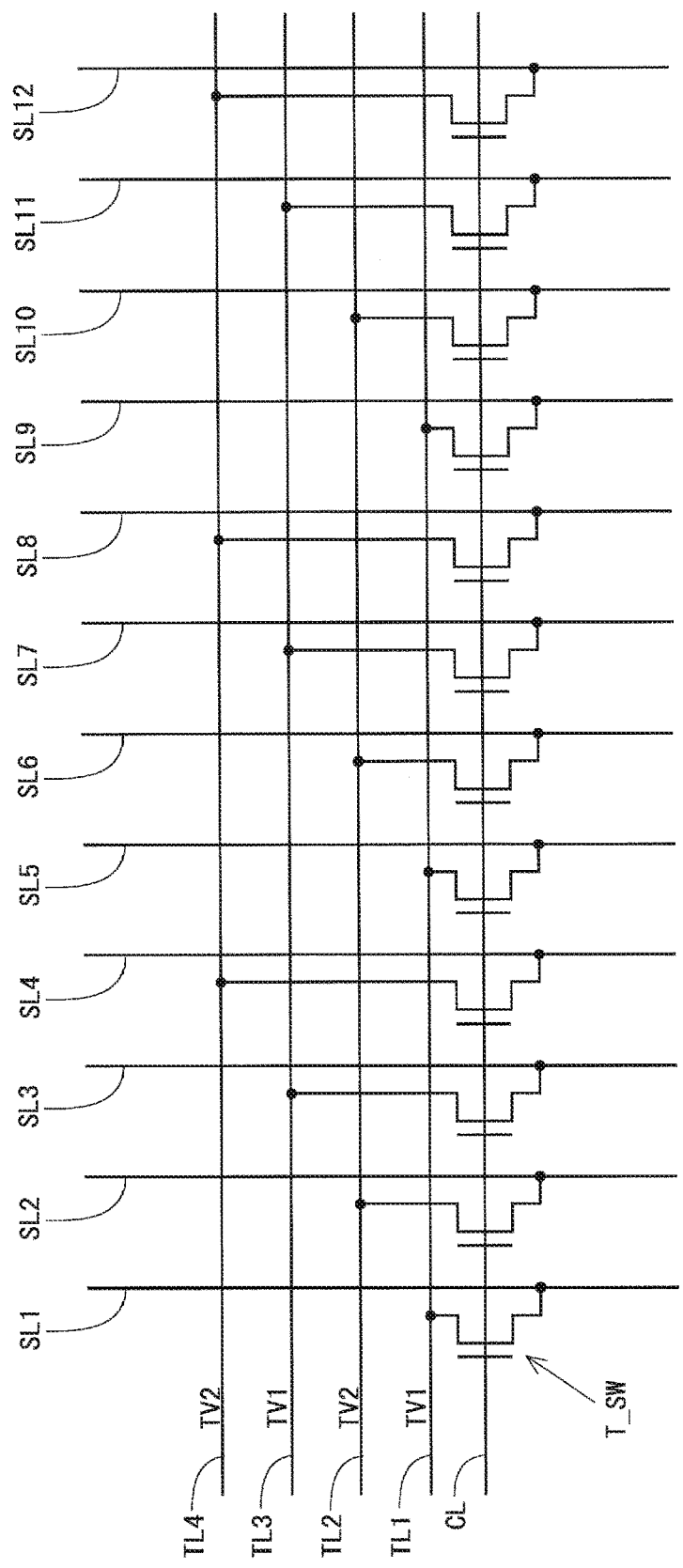
FIG. 15 is a circuit diagram illustrating a detailed configuration of the testing circuit according to a fourth variant of the first embodiment.

FIG. 15 is a circuit diagram illustrating a detailed configuration of the testing circuit 60 according to this variant. As illustrated in FIG. 15, the testing circuit 60 includes four testing lines (first to fourth testing lines TL1 to TL4). In the configuration illustrated in FIG. 15, where n is an natural number, a testing potential is supplied from the first testing line TL1 to the source bus lines SL of the (4n−3)th columns, a testing potential is supplied from the second testing line TL2 to the source bus lines SL of the (4n−2)th columns, a testing potential is supplied from the third testing line TL3 to the source bus lines SL of the (4n−1)th columns, and a testing potential is supplied from the fourth testing line TL4 to the source bus lines SL of the 4n-th columns. In such a configuration, the first potential TV1 is supplied as a testing potential to the first testing line TL1 and the third testing line TL3, and the second potential TV2 is supplied as a testing potential to the second testing line TL2 and the fourth testing line TL4. Therefore, similarly to the first embodiment, testing potentials of different magnitudes are supplied respectively to the source bus lines SL of the odd-numbered columns and the source bus lines SL of the even-numbered columns. As described above, the number of the testing lines included in the testing circuit 60 may be three or more.

It should be noted that, in this variant, the first-type potential supply line is implemented by the first testing line TL1 and the third testing line TL3, and the second-type potential supply line is implemented by the second testing line TL2 and the fourth testing line TL4.

<1.6.5 Fifth Variant>

Figure 16:
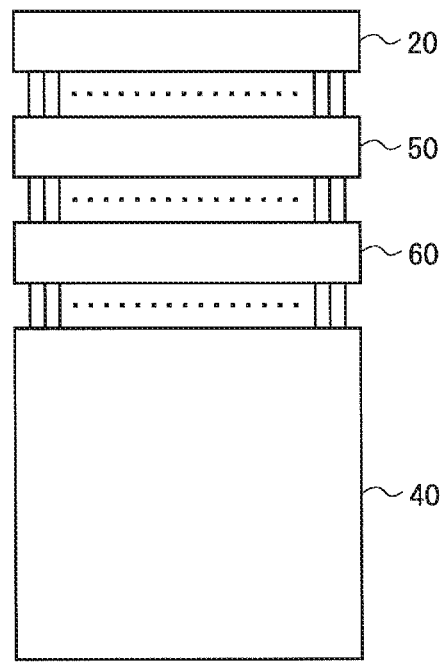
FIG. 16 is a diagram for illustration of a position of the testing circuit according to the first embodiment.
Figure 17:
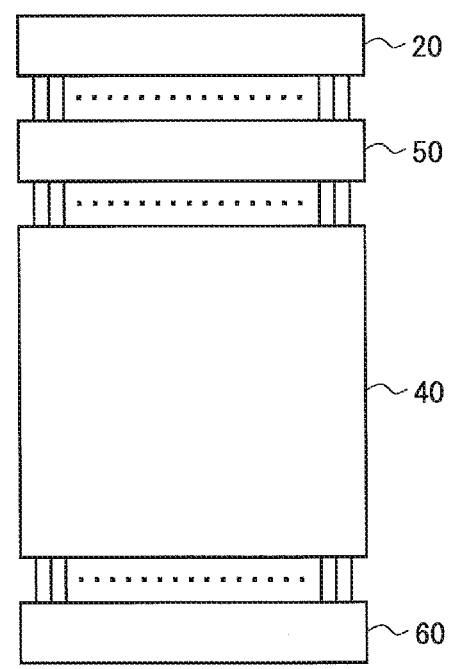
FIG. 17 is a diagram for illustration of a position of the testing circuit according to the variant of the first embodiment.
Figure 18:
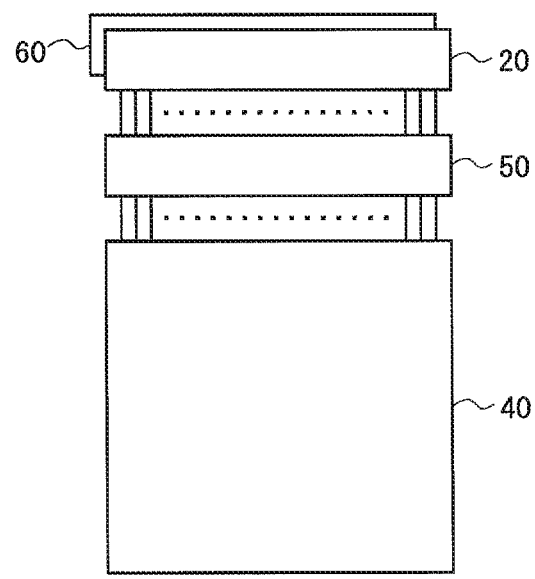
FIG. 18 is a diagram for illustration of a position of the testing circuit according to the variant of the first embodiment.

In the first embodiment, the testing circuit 60 is provided in the region between the layered region 50 and the active area 40 (see FIG. 16). However, a position at which the testing circuit 60 is provided is not particularly limited. As illustrated in FIG. 17, for example, it is possible to employ a configuration in which the testing circuit 60 is provided in a region on an opposite side of the layered region 50 with respect to the active area 40. Further, as illustrated in FIG. 18, for example, it is possible to employ a configuration in which the testing circuit 60 is disposed under the source driver 20 (IC chip).

<2. Second Embodiment>

Next, a second embodiment of the present invention will be described.

<2.1 Configuration>

Figure 19:
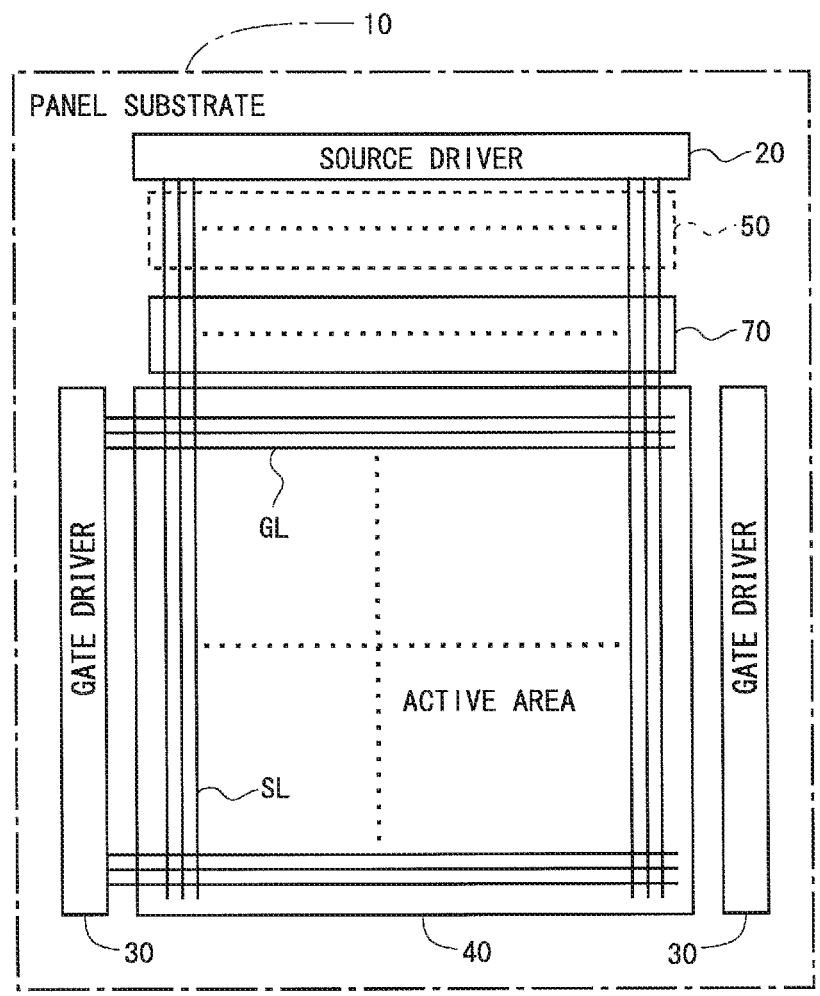
FIG. 19 is a block diagram illustrating an entire configuration of an active matrix-type liquid crystal display device according to a second embodiment of the present invention.

FIG. 19 is a block diagram illustrating an entire configuration of the active matrix-type liquid crystal display device according to a second embodiment of the present invention. The liquid crystal display device according to this embodiment is provided with a charge elimination circuit 70 in place of the testing circuit 60 in the first embodiment. The charge elimination circuit 70 is provided in a region between the active area 40 and the layered region 50. The charge elimination circuit 70 eliminates electric charges from the source bus lines SL and the pixel formation portions 4 when a device is turned off or terminated abnormally. The components other than the charge elimination circuit 70 are the same as those of the first embodiment, and therefore a description for these components will be omitted. Here, it is assumed that the wiring structure of the layered region 50 is the same as that of the first embodiment (see FIG. 1 and FIG. 5).

<2.2 Charge Elimination Circuit>

Figure 20:
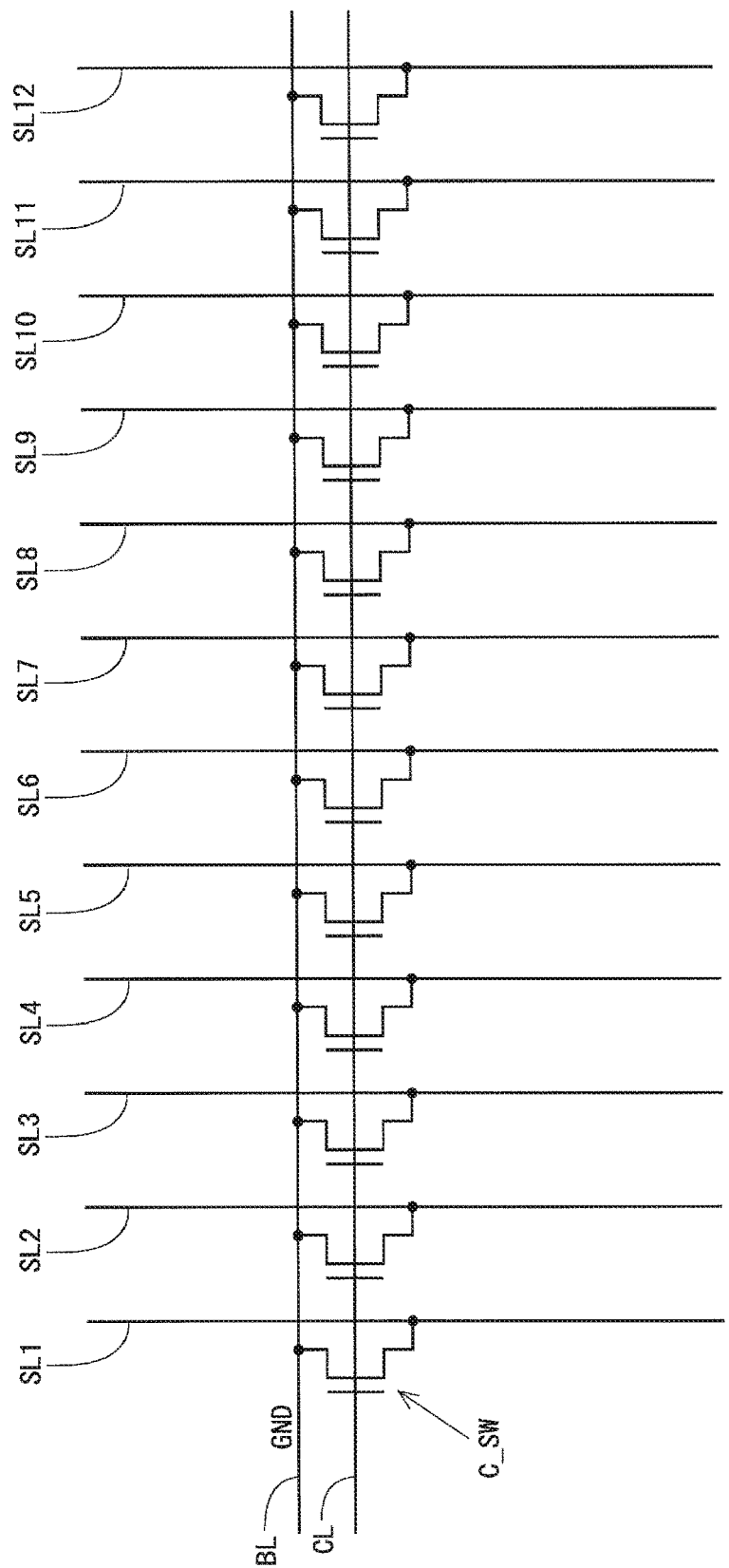
FIG. 20 is a circuit diagram illustrating a detailed configuration of a charge elimination circuit according to the second embodiment.

FIG. 20 is a circuit diagram illustrating a detailed configuration of the charge elimination circuit 70 according to this embodiment. The charge elimination circuit 70 includes a single reference potential line BL, a single control line CL, and control switches C_SW provided for the source bus lines SL. To the reference potential line BL, a ground potential GND is supplied. Each of the control switches C_SW is configured by a TFT. Regarding the control switch C_SW, a gate electrode is connected to the control line CL, a drain electrode is connected to the reference potential line BL, and a source electrode is connected to the source bus line SL.

In the above configuration, when a device is turned off or terminated abnormally, a control signal for turning the control switches C_SW on is supplied to the control line CL. With this, all of the control switches C_SW are turned on, and the ground potential GND is supplied to all of the source bus lines SL. As a result, electric charges are quickly eliminated from the source bus lines SL and the pixel formation portions 4, and thus, deterioration of display quality due to presence of residual electric charges is suppressed.

<2.3 Effects>

According to this embodiment, it is possible to supply the ground potential GND to all of the source bus lines SL when a device is turned off or terminated abnormally, for example. Therefore, electric charges on the source bus lines SL can be eliminated as needed. With this, it is possible to suppress deterioration of display quality due to presence of a residual electric charge in a display device having a layered wiring structure.

<2.4 Variant>

Figure 21:
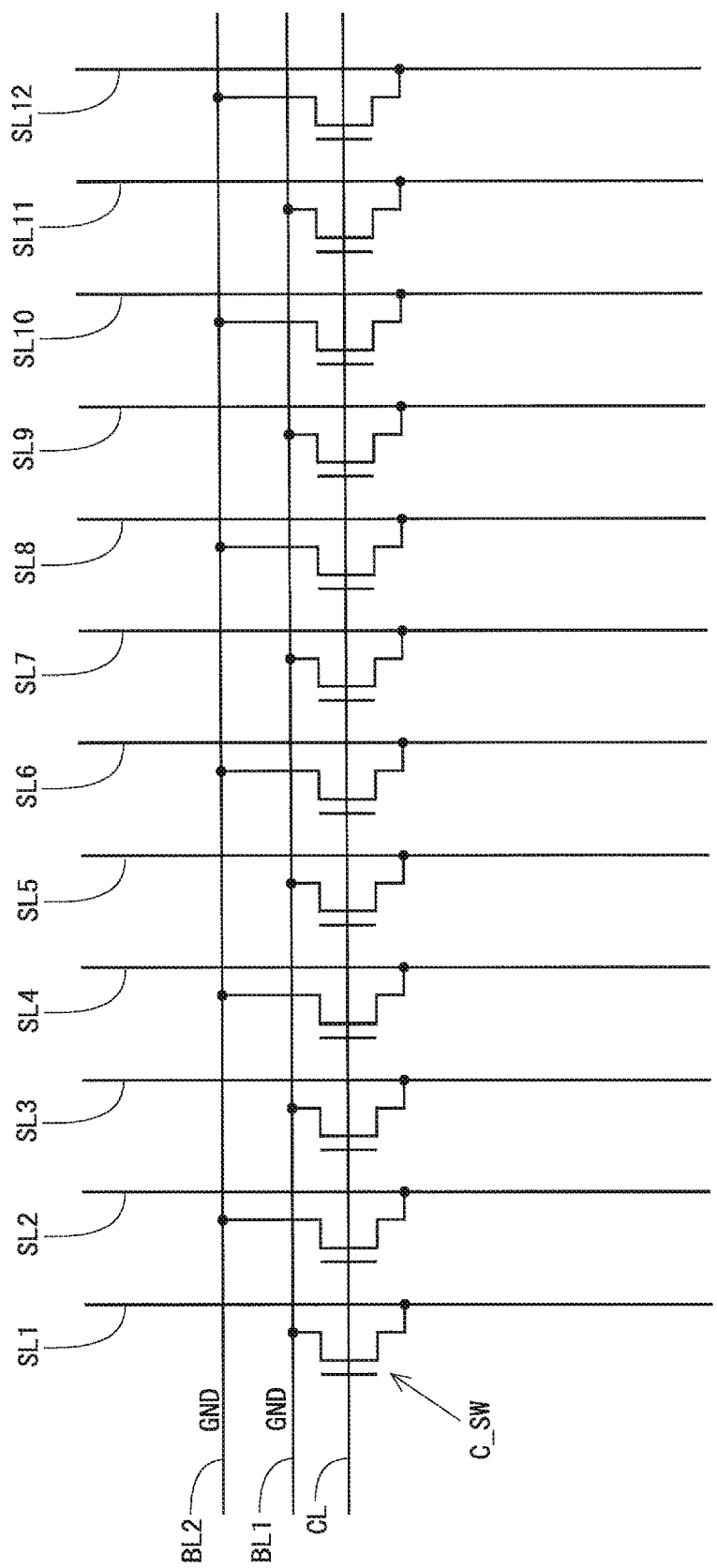
FIG. 21 is a circuit diagram illustrating a detailed configuration of a charge elimination circuit according to a variant of the second embodiment.
Figure 22:
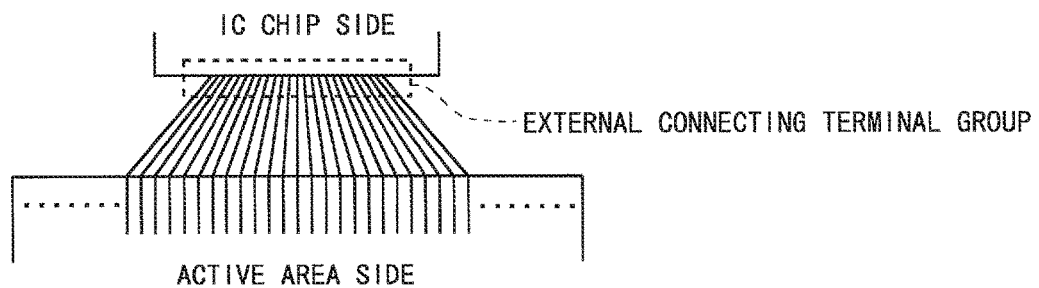
FIG. 22 is a diagram illustrating a wiring structure in a fan shape between an active area and external connecting terminals according to the conventional technique.
Figure 23:
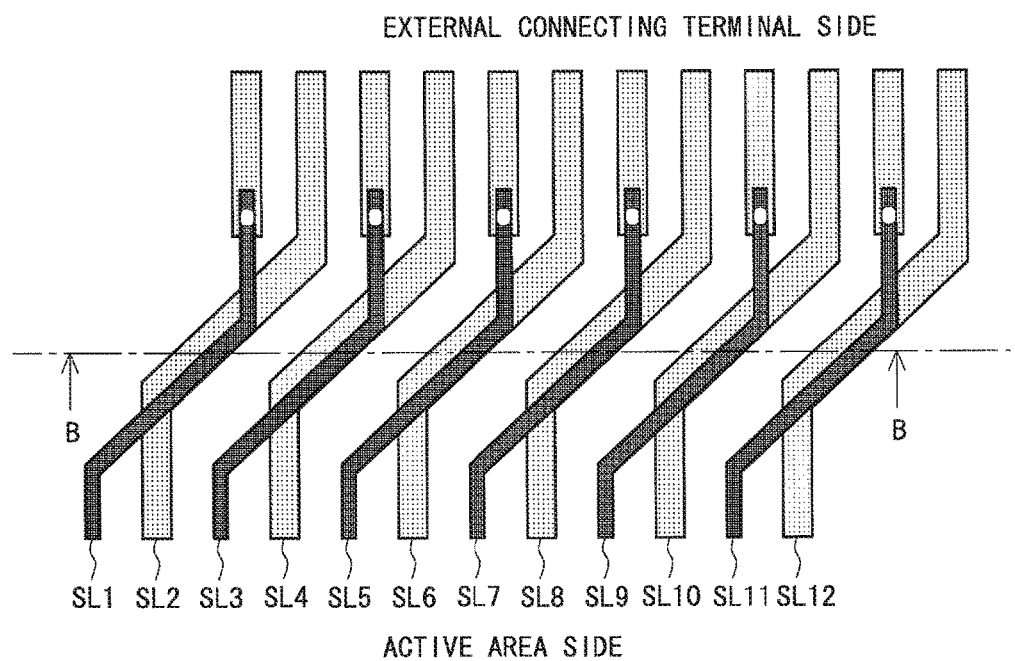
FIG. 23 is a plan view illustrating one example of a conventional layered wiring structure.
Figure 24:
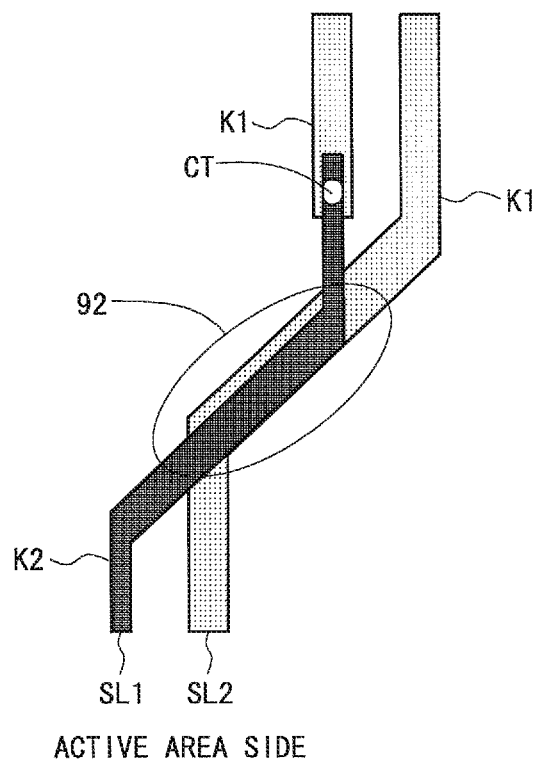
FIG. 24 is a diagram for detailed description of the wiring structure shown in FIG. 23.
Figure 25:
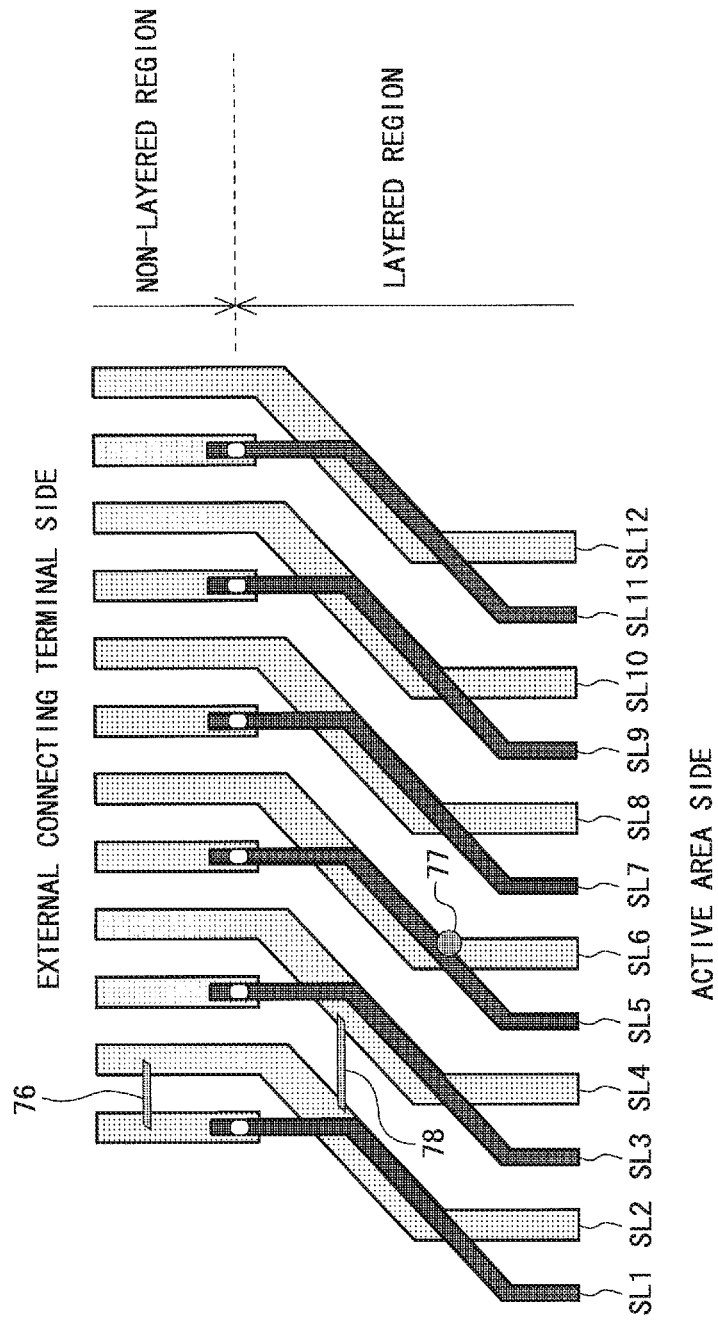
FIG. 25 is a diagram for description of leakage of a first type to a third type according to the conventional technique.
Figure 27:
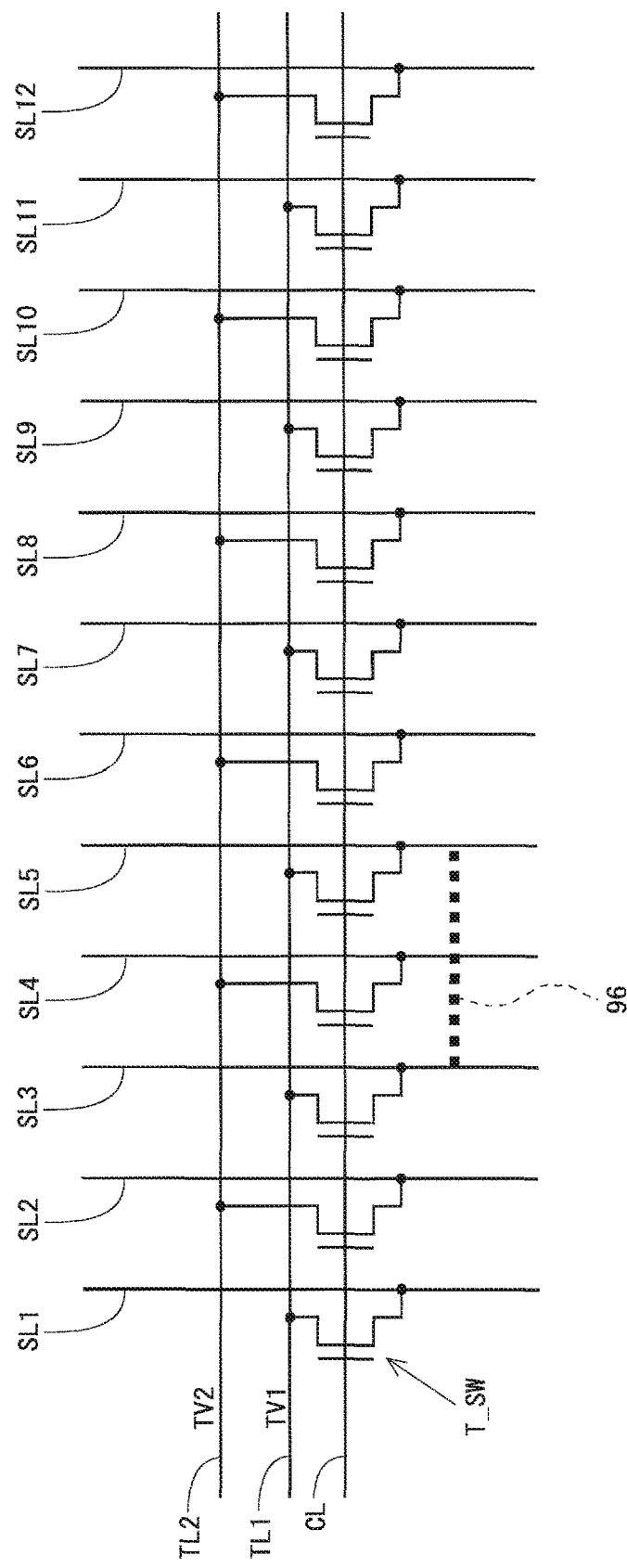
FIG. 27 is a diagram for illustration of a case in which a display device having the conventional layered wiring structure is provided with a simple testing circuit having two testing lines.
Figure 28:
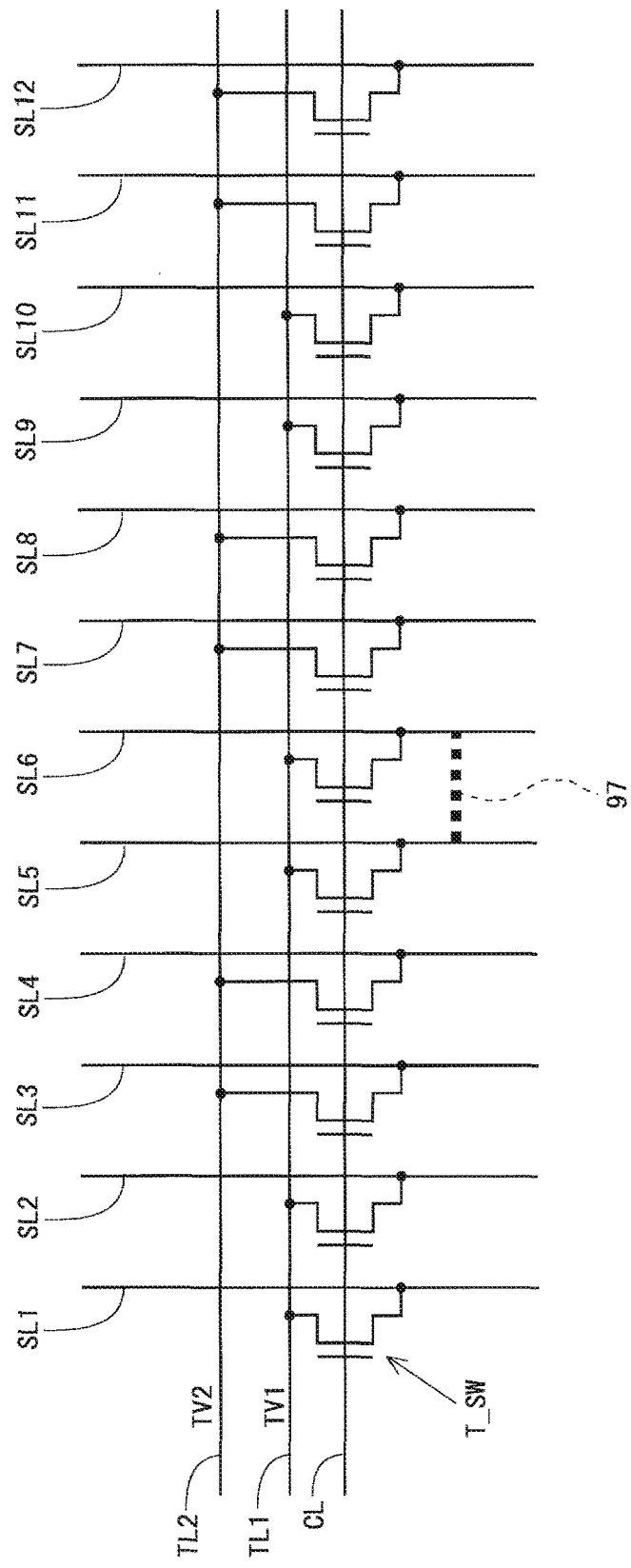
FIG. 28 is a diagram for illustration of a case in which a display device having the conventional layered wiring structure is provided with a simple testing circuit having two testing lines.
Figure 29:
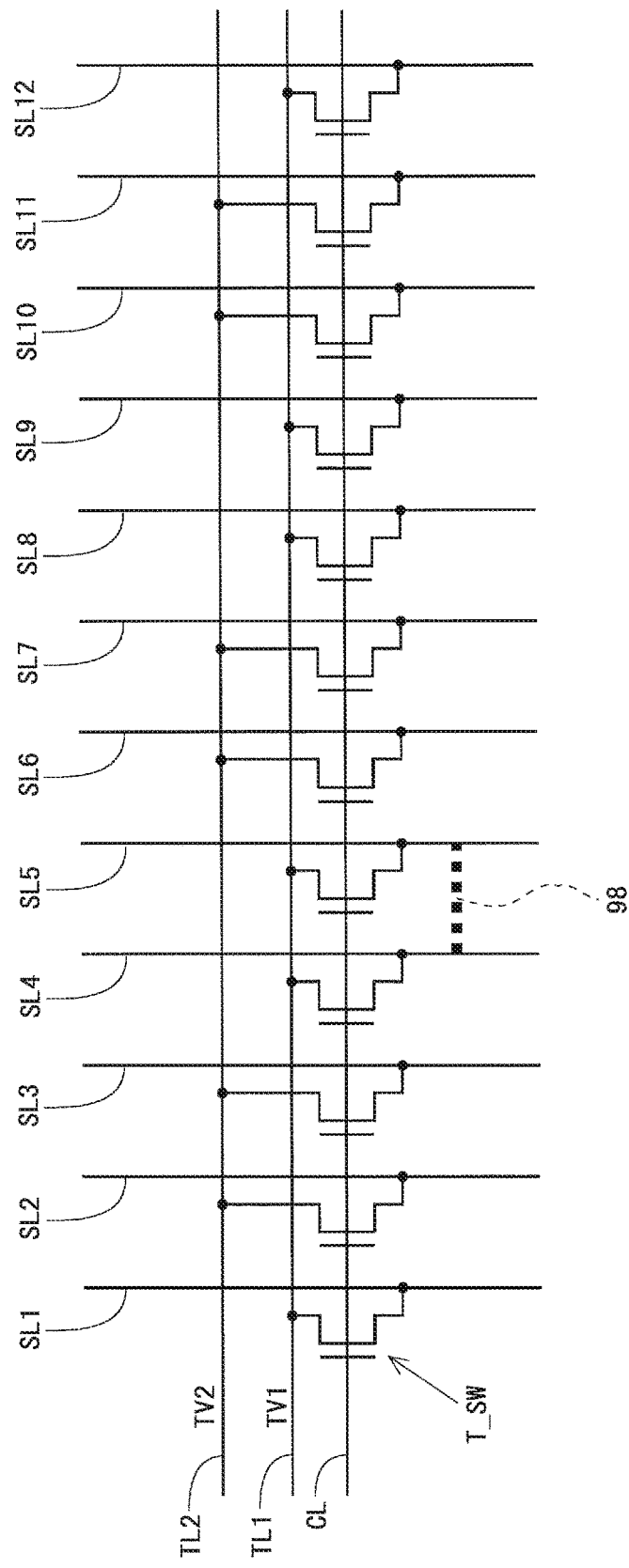
FIG. 29 is a diagram for illustration of a case in which a display device having the conventional layered wiring structure is provided with a simple testing circuit having two testing lines.

Although the charge elimination circuit 70 includes only one reference potential line in the second embodiment, the present invention is not limited to such an example, and the charge elimination circuit 70 may include a plurality of reference potential lines. For example, a configuration in which the charge elimination circuit 70 is provided with two reference potential lines (a first reference potential line BL1 and a second reference potential line BL2) as illustrated in FIG. 21 is employed, and the ground potential GND may be supplied to these two reference potential lines.

<3. Other>

The present invention is not limited to the embodiments described above, and various modifications may be made without departing from the scope of the present invention. For example, although the description is given taking the liquid crystal display device as an example in the above embodiments, the present invention is not limited to such an example. The present invention may be applied to a display device other than the liquid crystal display device, such as an organic EL (Electro Luminescence) display device.

DESCRIPTION OF REFERENCE CHARACTERS

4: PIXEL FORMATION PORTION
10: PANEL SUBSTRATE
15: EXTERNAL CONNECTING TERMINAL
20: SOURCE DRIVER
30: GATE DRIVER
40: ACTIVE AREA (DISPLAY REGION)
50: LAYERED REGION
50a: FIRST LAYERED REGION
50b: SECOND LAYERED REGION
60: TESTING CIRCUIT
70: CHARGE ELIMINATION CIRCUIT
CT: CONTACT
K1: FIRST-LAYER WIRING LINE
K2: SECOND-LAYER WIRING LINE
SL: SOURCE BUS LINE
TL1 TO TL4: FIRST TO FOURTH TESTING LINES
BL: REFERENCE POTENTIAL LINE

The invention claimed is:

1. A display device comprising:
a panel substrate including a layered region and a display region, the layered region including a layered wiring structure of a plurality of layers;
a plurality of video signal lines provided on the panel substrate;

a potential supply line that supplies a predetermined potential to each of the plurality of video signal lines; and a plurality of external connecting terminals, provided on the panel substrate, for receiving supply of video signals to be applied to the plurality of video signal lines, wherein the plurality of video signal lines are provided to extend from the plurality of external connecting terminals into the display region via the layered region, and in the layered region, two video signal lines adjacent in a vertical direction are a combination of a video signal line of an odd-numbered column and a video signal line of an even-numbered column, and two video signal lines adjacent in a horizontal direction in a same layer of the plurality of layers are a combination of a video signal line of an odd-numbered column and a video signal line of an even-numbered column.

2. The display device according to claim 1, wherein the potential supply line includes a first-type potential supply line connected to the video signal line of the odd-numbered column and a second-type potential supply line connected to the video signal line of the even-numbered column.

3. The display device according to claim 2, wherein the potential supply line includes a single first-type potential supply line and a single second-type potential supply line.

4. The display device according to claim 2, wherein potentials of different values are respectively supplied to the first-type potential supply line and the second-type potential supply line.

5. The display device according to claim 1, wherein a predetermined reference potential is supplied to the plurality of video signal lines via the potential supply line.

6. The display device according to claim 1, wherein
the panel substrate includes, as the layered region, a first layered region and a second layered region between the plurality of external connecting terminals and the display region, and
each of the plurality of video signal lines is wired in different layers in the first layered region and the second layered region.

* * * * *